Feb. 19, 1957 D. ALLANSON 2,782,253
CAMERAS, PARTICULARLY TELEVISION CAMERAS
Filed March 17, 1952 3 Sheets-Sheet 2
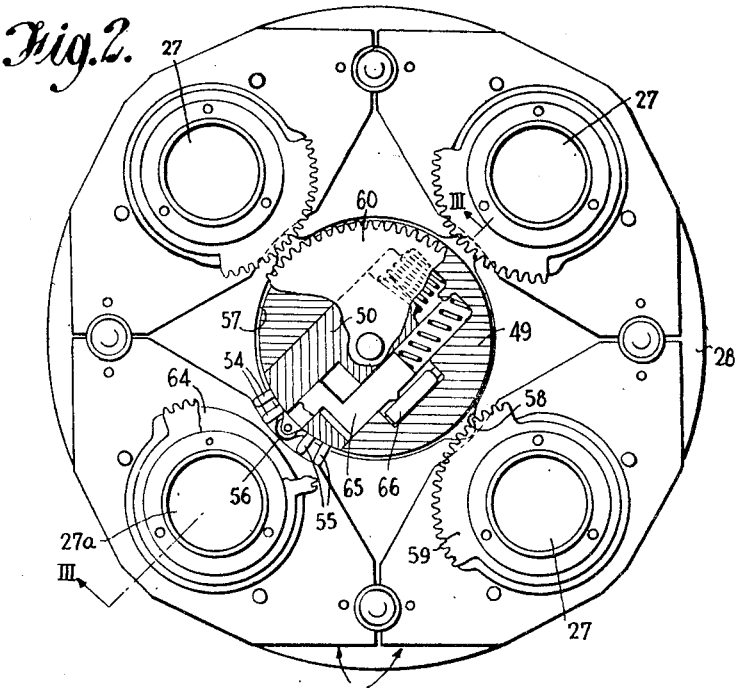
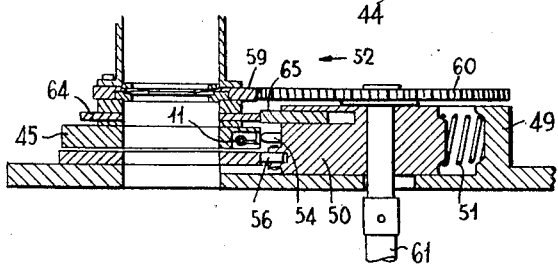
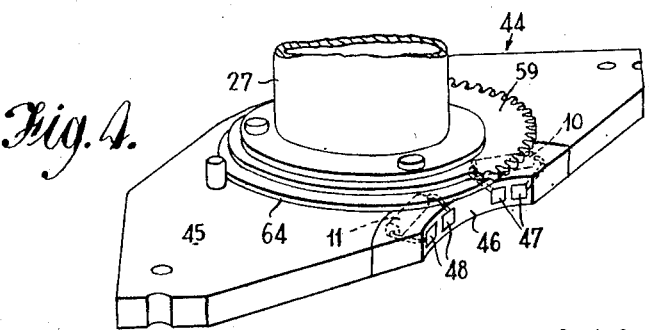
Inventor
DOUGLAS ALLANSON
By Emery Holcombe Blair
Attorneys

United States Patent Office 2,782,253
Patented Feb. 19, 1957

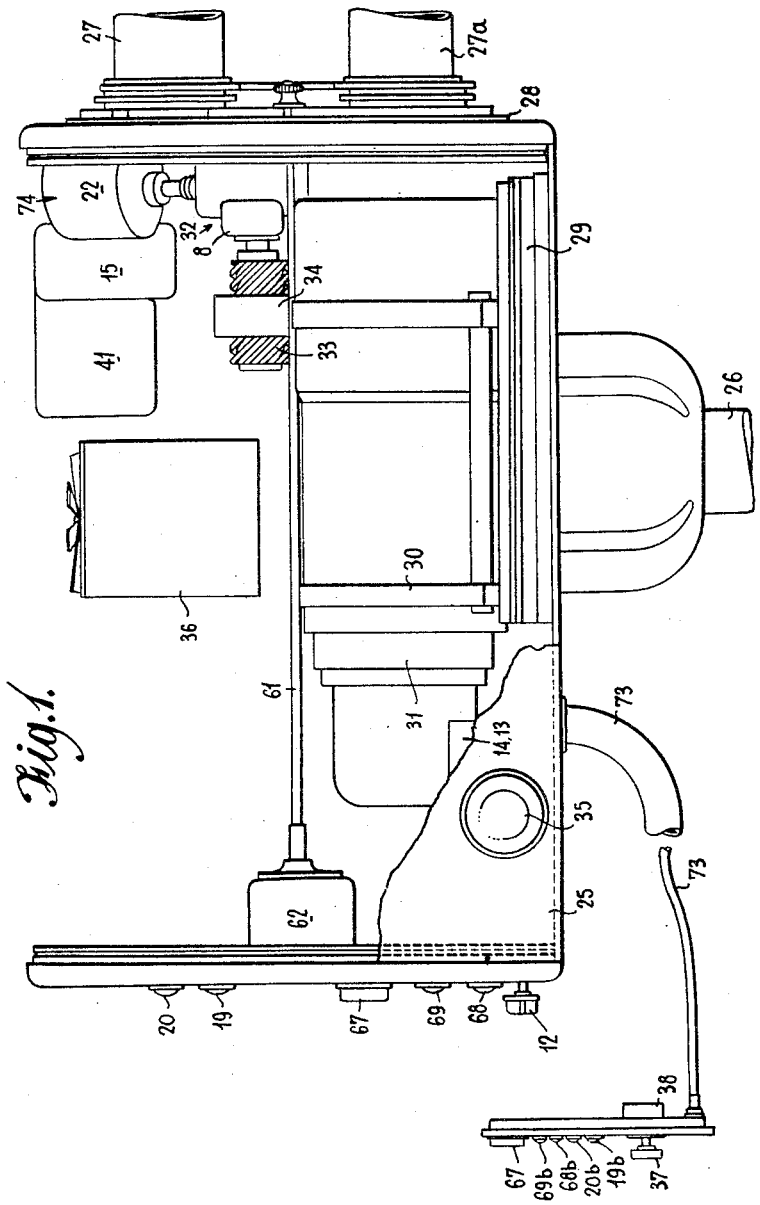

2,782,253

CAMERAS, PARTICULARLY TELEVISION CAMERAS

Douglas Allanson, Cambridge, England, assignor to Pye Limited, Cambridge, England, a British company Application March 17, 1952, Serial No. 276,895

Claims priority, application Great Britain March 22, 1951

12 Claims. (Cl. 178—7.2)

The present invention relates to cameras, particularly television cameras, and has for an object to provide an arrangement for adjusting the focussing of the camera by electrical means controlled either from a control member mounted on the camera or from a control member at a remote point.

According to the present invention, the focussing of the camera is effected by means of a servomotor controlled from the output of a bridge circuit, said output being derived across the moving contacts of a pair of potentiometers, one of which is adapted for manual adjustment, and the other adapted to be adjusted by the movement of the servomotor. Thus, by moving the manually adjustable potentiometer, the balance of the bridge is upset and causes the motor to operate to drive the focussing mechanism and the motor potentiometer until bridge balance is again restored, when the motor stops with the camera focussed to the new position. The output from the bridge circuit may be fed to the servomotor through an amplifier.

The arrangement according to the present invention enables the camera to be focussed by a control potentiometer either at the camera itself or at a remote point and, according to a feature of the invention, a switch is provided, preferably on the camera, for connecting either the local potentiometer or the remote potentiometer in the focus control circuit. Conveniently, two local manual potentiometers may be provided, for example, on the right-hand and left-hand sides of the camera, the switch then enabling either of the local potentiometers or the remote potentiometer to be selected.

The invention may be employed in conjunction with television cameras provided with a turret at the front of the camera upon which are mounted a plurality of different lenses which may be selectively positioned in front of the television pick-up tube. The focussing of the camera is effected by moving the pick-up tube relative to the lens in the operative position, and the distance through which the pick-up tube has to be moved in order to focus the camera from close-ups to infinity, will vary in accordance with the particular lens in the operative position. It is convenient that the manual control potentiometer should move through approximately the same angle or distance for adjusting the camera from close-ups to infinity, irrespective of the lens which is in use, and this is achieved, according to a feature of the invention, by automatically varying the characteristics of the focus control circuit in accordance with the lens in use so that the local and/or remote manual control potentiometer will be moved through approximately the same angle or distance for focussing the camera from close-ups to infinity irrespective of the particular lens in use. This feature of the invention may be carried into effect by automatically connecting different auxiliary resistors in the control circuit depending upon the lens which is in use. These auxiliary resistors are respectively associated with the different lenses and connected with contacts which are automatically connected in the control circuit when the corresponding lens is moved into the operative position. The auxiliary resistor may be connected in series with the potentiometer driven by the servomotor so that the servomotor will execute different movements for the same movement of the manual potentiometer, depending upon the value of the auxiliary resistor connected in series with the motor driven potentiometer.

The servomotor may be provided with a generator winding which serves for producing a feedback voltage in accordance with the speed of the motor to counteract hunting and ensure stopping of the motor when bridge balance is substantially achieved. Since the feedback voltage necessary to produce critical damping of the overrun will vary depending upon the ratio of movement of the servomotor to the manual control potentiometer, further auxiliary resistors are associated with the lenses in order that the feedback ratio will also be automatically adjusted in accordance with the particular lens in the operative position. These auxiliary feedback resistors may be selectively connected in the circuit of the generator winding as the turret is turned to its different positions.

Preferably each lens is constructed as a separate demountable unit equipped with its auxiliary resistors and capable of being mounted on the turret plate. The correct resistors are then permanently associated with the lens units and will be automatically connected in the control circuits when that lens unit is mounted on the turret and moved to the operative position. The lens units may also incorporate means for adjusting the setting of the iris diaphragm of the lens, which means may be automatically coupled to an iris control motor when that lens is in the operative position. The motor may drive the iris diaphragm control through a gear or friction drive as described, for example, in my co-pending application Serial No. 187,082, or in British specification No. 670,602. The iris control motor may be controlled by a pair of relays which may be selectively operated to complete circuits for driving the motor in one direction or the other. These relays may be controlled by pushbutton or other switches on the camera itself or at a remote point.

In order that the invention may be more readily understood reference will now be made to the accompanying drawings, in which:

Fig. 1 is a side view of the camera with part of one side wall removed;

Fig. 2 is a front view showing the turret with part of the co-operating mechanism;

Fig. 3 shows a detail, substantially in section on line III—III of Fig. 2;

Fig. 4 is a perspective view of an individual lens unit, and

Figure 5:
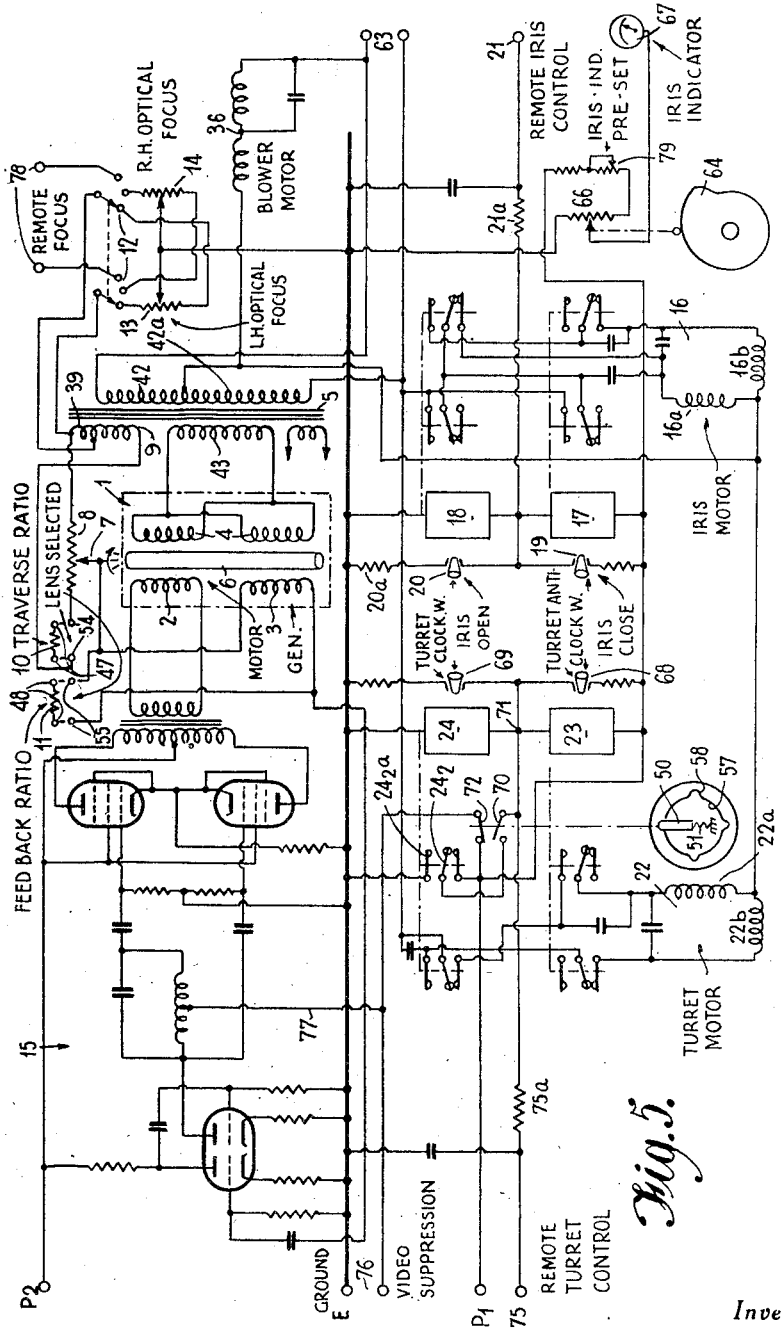
Fig. 5 is a circuit diagram.

Referring now first to Fig. 1, the camera comprises a housing 25 which may be mounted on a suitable stand 26 and at the front of which a number of individual lenses 27, 27a are mounted on a rotatable turret 28. Slidably supported on guide rails 29 inside the camera housing 25 is a mounting cradle 30 carrying a pick-up tube 31 and determining an operative lens position, namely the position which lens 27a is shown to occupy. Focussing of the camera is effected by movement of the cradle 30 along the guides 29 in the direction of the optical axis of the lens in the operative position. According to a feature of the present invention, a motor drive 32 is provided for effecting the focussing movement of the mounting cradle 30, and as illustrated, the drive 32 moves the cradle 30 by means of an eight-start screw spindle 33 engaging a control nut member 34 on the cradle. A focussing knob 35 shown on one side of the camera is arranged to actuate a potentiometer 14, while a further similar focussing knob 35 and potentiometer 13 are preferably provided at the other side of the camera; a third focussing knob or the like 37 co-operating with a suitable potentiometer 38 may be arranged at a remote station connected with the camera by a cable 73. A fourth potentiometer 8 has its movable contact 7 mechanically coupled with the motor drive 32 so that the position of its contact 7 will vary in accordance with the focussing position of the pick-up tube cradle 30. A switch 12 at the back of the camera housing serves for selectively connecting the movable contact of one or other of the two potentiometers 13, 14 or of the remote potentiometer 37 with contact 7 of potentiometer 8. The control of the focussing drive 32 from the potentiometers is effected with the help of a control unit 41 and an amplifier 15, electrical details of which are shown in Fig. 5.

Referring now to Fig. 5, the rectangle 1 represents the servomotor of the drive 32, having a motor winding 2 and a generator winding 3, as well as field windings 4 for both the motor and generator sections, said field windings being energised from a 50 volt secondary winding 43 of a transformer 5, the primary 42, 42a of which is connected at 63 to an A. C. mains.

The spindle 6 of the servomotor 1 is connected to gearing including the screw spindle 33 to move the cradle 30 carrying the pick-up tube 31. The spindle 6 also drives the moving contact 7 of the potentiometer 8, which potentiometer is connected across a further secondary winding 9 of the transformer 5. Adapted to be connected in series with the potentiometer 8 are auxiliary resistors 10 which, as will be described further below, are carried by the lens turret 28 and associated respectively with the different lenses 27, 27a, so that a resistor will be automatically connected in series with the potentiometer 8 which has a value corresponding to the lens in the operative position.

Connected across a section 39 of the winding 9 is the switch 12 which may be selectively moved to either of three positions, in which either of the two local potentiometers 13 and 14 or the remote potentiometer 37 (connected across terminals 78) is connected across section 39 of the winding 9. By varying the potentiometer which is connected in the circuit, the potential balance between the moving contacts on the potentiometer 8 and the manual potentiometer 13, 14 or 37 is upset. The resulting voltage difference is applied to the input of the amplifier 15, the output of which is connected to feed the armature winding 2 of servomotor 1. The servomotor thus turns and adjusts the position of the moving contact 7 on the potentiometer 8 until potential balance is again restored, when the motor stops. In order to prevent over-running of the servomotor, the generator winding 3, which is arranged to have an appreciable internal resistance, is shunted by one or another of a set of interchangeable resistors 11, which in a manner to be described further below, are selectively connected across said winding depending on the lens in the operative position, and the voltage developed across the resistor 11 is applied to the amplifier input circuit as shown in Fig. 5 so as to oppose the continuation of movement towards a position of potential balance by acting as a feedback voltage on the amplifier. It will be apparent that with this arrangement the feedback ratio will vary in accordance with the value of the auxiliary resistor 11 in use.

In order to ensure that appropriate resistances 10 and 11 according to the data of the lens in use are included in the circuit when any lens is brought into the operative position by the turret, each lens forms part of a lens unit 44 adapted to be mounted bodily on the turret 28. For this purpose, each lens unit 44, as shown in Fig. 4, has a base plate 45 having suitable attachment and locating means co-operating with corresponding means on the turret, and a pair of resistor elements 10 and 11 having the correct resistance values depending on the data of the lens 27 of the unit are embodied in each lens unit. In the embodiment of Fig. 4, the base plate 45 includes a body of insulating material presenting a cylindrical surface 46 facing the turret axis, in which two pairs of contact segments 47 and 48 are embedded, the resistors 10 and 11 being respectively connected across the segments 47 and 48. The turret 28 is of substantially annular shape and rotates about a central boss 49 in which a slide member 50 is mounted for radially sliding movement, a spring 51 or its equivalent being provided for urging the slide 50 in the direction of the arrow 52 towards the operative lens position, which in Figs. 1 and 2 is occupied by lens 27a. At its end 53, that is at its front end in the direction of the arrow 52, the slide 50 carries two pairs of contact studs 54 and 55 respectively which preferably are of resilient construction and are so arranged as to co-operate respectively with the contact segments 47 and 48 of the lens unit in the operative position. In order to avoid damage to the contact studs, means are provided for moving the slide 50 back against the action of the spring 51, except when a lens is in the operative position. With this object in view, the slide 50 is provided with a nose 56 which normally rides on the inner surface 57 of the turret 28, this surface being provided with notches 58 in positions corresponding to each lens carried by the turret. It will thus be obvious that when any lens on the turret is in the operative position, the nose 56 of slide 50 will rest in the corresponding notch 58 of the turret, thereby allowing contact studs 54 and 55 of the slide 50 to engage respectively the contact segments 47 and 48, of the corresponding lens unit 44. Each lens unit is preferably also provided with an adjustable iris diaphragm, and the camera as illustrated is also equipped with motor-driven means for the adjustment of the said iris diaphragms and with means for indicating the diaphragm stop settings of the iris diaphragm associated with the lens which is in the operative position. For this purpose, each lens unit 44 carries a diaphragm-setting gear wheel or friction wheel 59 and the slide 50 carries a corresponding driving wheel 60 which, when a lens unit is in the operative position, engages the diaphragm setting wheel 59 of the said unit. It will be observed that, owing to the provision of the nose 56, as soon as the turret starts to rotate in order to move another lens unit into the operative position, the slide 50 will move back and thus disengage the driving wheel 60 from the diaphragm setting wheel 59; this prevents the setting effected from being altered by the rotation of the turret and ensures that when the same lens is once more moved into the operative position, its diaphragm will show the previously set stop opening.

The wheel 60 itself is driven, for example through a suitably movable shaft 61, by an iris motor drive 62, and pairs of control buttons 19 and 20 for setting the driving motor into operation in one direction or the other are provided at one or more suitable places on the camera and if desired also at remote places. The iris motor drive may comprise, as shown in the circuit diagram of Fig. 5, an iris control motor 16 and a pair of normally energised relays 17 and 18 which when de-energised respectively cause one or the other of two windings 16a, 16b of the motor 16 to be energised by winding 42a of transformer 5, thus causing the motor to rotate in a direction for closing or opening the diaphragm aperture. The windings of relays 17 and 18 are normally connected in series between an earth connection E and a terminal $P_1$ carrying a suitable D. C. voltage, so that both relays are normally energised to take up the positions as shown in Fig. 5. Two press buttons 19 and 20 are provided, each of which, when pressed down, creates a by-pass (including a resistor 19a and 20a respectively) short-circuiting the winding of one of the relays 17 and 18, which, as a result, will drop its armature. Further iris control buttons 19b, 20b similar to buttons 19 and 20 may be provided at the remote control station (see Fig. 1) and arranged to connect point 21 to lines E and P₁ respectively, a single common by-pass resistance 21a being provided in these remote-control circuits. The contacts operated by relays 17 and 18, are indicated by broken-line connection to the representation of the winding of the relay in question, and it will be evident from Fig. 5 that when one or the other of the windings 17 and 18 is de-energised, current from the transformer winding 42a will be supplied to one or the other of windings 16a, 16b of the iris motor 16 to rotate the said motor in one or the other direction.

It is desirable that the diaphragm stop setting of the lens which at any time is in the operative position should be indicated at a convenient point, and while for this purpose any of the means described in co-pending application Serial No. 187,082, filed September 27, 1950, may be employed, in the embodiment a cam 64 (Fig. 4) has been provided in the lens unit for common rotation with the diaphragm setting wheel 59 of the unit, this cam being engaged, when in the operative position, by a spring-urged tappet 65 in the hub 49, whereby the tappet 65 is moved to a position corresponding to the stop setting of the diaphragm of the lens unit in question. The tappet slide 65 is arranged to move the tapping of a potentiometer 66, and thereby vary the voltage supplied to one or more suitable indicators 67 on the camera housing or at the remote point. A pre-setting resistance for the indicator circuit is shown at 79.

The rotation of the turret 28 may be effected by a turret drive 74 including a motor 22 which may be controlled for rotation in one direction or the other by a pair of relays 23 and 24 arranged to be controlled somewhat similarly to relays 17 and 18 by local shunting buttons 68 and 69 or remote buttons 68b, 69b, the latter being connected to the relays by a line 75. It is, however, desirable that the turret drive, once a button has been pressed, continues to operate even after the button has been released until the next indexing position of the turret is reached. For this purpose each relay 23 and 24 is arranged, when de-energised, to close its own by-pass circuit. Assuming, for example, the relay 24 has been de-energised, it will be seen that its movable contact 24₂ will engage a stationary contact 24₂ᵃ and thus, provided that a further contact 70 is closed, establish a direct connection between the earth terminal E and the junction 71 between the two windings 23 and 24, and that as a consequence winding 24 is short-circuited, while the full voltage between P₁ and E will be applied across winding 23. Contact 70 is controlled by the turret 28 and may, for example be operated by the slide 50 so as to be closed as long as the nose 56 of said slide rides on the inner surface 57 of the turret and to open when the nose 56 engages one of the notches 58. It will thus be seen that when button 69 has been pressed and relay 24 has dropped its armature and the turret motor 22 has started rotating the turret 28 so as to push the slide 50 back against the action of spring 51, relay 24 will remain de-energised even on release of the button 68 until upon the turret reaching the next indexing position the nose 56 of the slide 50 engages the next notch 58 of the turret, thereby opening the switch 70 and thus stopping the motor by re-energising relay 24. If, on the other hand, button 68 has been pressed to de-energise winding 23, a by-pass circuit for the latter relay will be established in a manner which will now be evident. De-energisation of relay 23 or 24 will cause one or the other of two windings 22a, 22b of motor 22 to be energised, thus starting said motor in one direction or the other.

A further switch 72, likewise operated by slide 50, but in such a manner as to be closed only if the nose 56 of the slide 50 rests in a notch 58, may be included in a line 76 controlling the transmission of video signals, thus ensuring that the transmission of vision is interrupted while the turret is moved from one indexing position to another. The anode voltage for at least one stage of the amplifier 15 may also be derived from line 76 as shown at 77, so that the current supply to the winding 2 of the focussing motor 1 is likewise interrupted during movement of the turret.

Since an appreciable amount of heat is developed in the camera, a blower motor 36 is preferably connected across winding section 42 of the transformer 5 so as to be energised whenever mains voltage is available at terminals 63.

I claim:

1. In a camera having adjustable focussing means including a focus control member for focussing the camera in accordance with the object distance, the combination of two adjustable potentiometers each adapted to be connected to a voltage supply, and to supply when so connected an output voltage variable according to the adjustment of said potentiometer, adjusting means for one of said potentiometers coupled for movement with said focus control member, manually operable adjusting means for the other potentiometer, an electric motor drive for said focus control member, electrical voltage generating means connected with said motor drive for producing a feed-back voltage variable in accordance with the rate of movement of said drive, and means differentially controlled by the output voltages of said two potentiometers and by said feed-back voltage for controlling the operation of said motor drive.

2. In a camera having adjustable focussing means including a focus control member for focussing the camera in accordance with the object distance, the combination of two adjustable potentiometers each adapted to be connected to a voltage supply and to supply when so connected an output voltage variable according to the adjustment of said potentiometer, adjusting means for one of said potentiometers coupled for movement with said focus control member, manually operable adjusting means for the other potentiometer, a power drive for said focus control member, said power drive having means for producing an auxiliary voltage variable in accordance with the rate of movement of the power drive, an amplifier the input voltage of which is derived from the voltage difference of the output voltages of said two potentiometers and from the said auxiliary voltage so that its absolute value is the lower, the faster the motor drive varies the adjustment of said one potentiometer towards the position at which said two output voltages are equal, and means energised by the output of said amplifier, for controlling the operation of said motor drive.

3. A television camera comprising a lens for producing an optical image, a pick-up tube including an element on which said optical image must be focussed, focussing mechanism for varying the distance between said lens and said element, a reversible electric motor operatively connected to said focussing mechanism, a generator winding on said motor for producing an auxiliary voltage variable in accordance with the rate of rotation of the motor, a first potentiometer having a movable tapping member positively coupled mechanically with said focussing mechanism, a second potentiometer having a manually adjustable tapping member, electrical means connected to said two tapping members for differentially controlling the energisation of said motor according to voltage conditions on said two tapping members, and means for feeding back to said electrical means a voltage derived from said auxiliary voltage to counteract over-running of the motor.

4. A camera comprising a plurality of lenses, a camera housing determining an operative lens position and having means for selectively holding each said lens in said operative position and means determining a focal plane, focussing mechanism for adjusting the distance between said lens and said focal plane, a potentiometer having an adjustable tapping, a control member operable by said focussing mechanism for adjusting said tapping, a plurality of pairs of electric resistors respectively associated with said lenses, contact means in the camera for connecting, when a lens is placed in the operative position one of the resistors associated with said lens in series with said potentiometer, a second potentiometer having an adjustable tapping, manually operable means for adjusting the tapping of said second potentiometer, a motor drive for said focussing mechanism including an electric motor having a generator winding for producing an auxiliary voltage which is variable in accordance with the rate of rotation of the motor, electrical control means for said motor drive connected across said tappings for causing the drive to move the focussing mechanism to a position corresponding to the position of said manual control means, the values of said individual resistors being so determined in accordance with the data of each lens that approximately the same amount of movement of the manual control means will cause the focussing to be varied from close-ups to infinity irrespective of the lens which is in the operative position, means including the other said resistor for supplying to said control means a feed-back voltage derived from said generator winding in accordance with the value of said other resistor, to counteract hunting.

5. A television camera comprising a camera housing, a pick-up tube mounted in said housing, a lens mounted in front of the pick-up tube, a reversible electric motor for adjusting the pick-up tube towards and away from said lens, a potentiometer connected across a voltage source and having an adjustable tapping, means for adjusting said tapping by the movement of the electric motor, a focus control member comprising a further potentiometer connected across a voltage source and having an adjustable tapping movable by the movement of said focus control member, means for feeding the voltage difference between the tappings of said two potentiometers to the input of an amplifier, means for feeding the output from said amplifier to operate said motor, voltage generating means driven by said motor for generating an auxiliary voltage variable in accordance with the speed of the motor, and means for feeding said auxiliary voltage to said amplifier in a sense to counteract over-running of the motor.

6. A television camera comprising a camera housing, a pick-up tube mounted in said housing, a rotatable turret mounted at the front of said housing, a plurality of lens units each including a lens mounted on said turret, means for indexing the turret in a plurality of positions in which the different lenses are selectively positioned in an operative position in front of the pick-up tube, a reversible electric motor for adjusting the pick-up tube towards and away from the lens in the operative position, a potentiometer connected across a voltage source and having an adjustable tapping, means for adjusting said tapping by the movement of the electric motor, a focus control member comprising a further potentiometer connected across a voltage source and having an adjustable tapping movable by the movement of said focus control member, means for feeding the voltage difference between the tappings of said two potentiometers to operate said motor, voltage generating means driven by said motor for generating an auxiliary voltage variable in accordance with the speed of the motor, means for feeding said auxiliary voltage to said motor in a sense to counteract overrunning of the motor, each said lens unit comprising a mounting means for the lens adapted for attachment to the turret and carrying two resistors and four insulated electric contacts, two of said contacts being interconnected by one resistor and the other two contacts interconnected by the other resistor, and contact means carried by the camera housing and engaging with the contacts carried by the mounting means of the lens unit in the operative position to connect one of the resistors thereof in series with the motor driven potentiometer and the other resistor thereof in series with the auxiliary voltage generator.

7. A television camera comprising a camera housing, a pick-up tube mounted in said housing, a rotatable turret mounted at the front of said housing, a plurality of lens units each including a lens mounted on said turret, means for indexing the turret in a plurality of positions in which the different lenses are selectively positioned in an operative position in front of the pick-up tube, a reversible electric motor for adjusting the pick-up tube towards and away from the lens in the operative position, a potentiometer connected across a voltage source and having an adjustable tapping, means for adjusting said tapping by the movement of the electric motor, a focus control member comprising a further potentiometer connected across a voltage source and having an adjustable tapping movable by the movement of said focus control member, means for feeding the voltage difference between the tappings of said two potentiometers to the input of an amplifier, means for feeding the output from said amplifier to operate said motor, voltage generating means driven by said motor for generating an auxiliary voltage variable in accordance with the speed of the motor, means for feeding said auxiliary voltage to said amplifier in a sense to counteract over-running of the motor, each said lens unit comprising a mounting means for the lens adapted for attachment to the turret and carrying two resistors and four insulated electric contacts, two of said contacts being interconnected by one resistor and the other two contacts interconnected by the other resistor, and further contacts carried by the camera housing and engaging with the contacts carried by the mounting means of the lens unit in the operative position to connect one of the resistors thereof in series with the motor driven potentiometer and the other resistor thereof in series with the auxiliary voltage generator.

8. A television camera as claimed in claim 7, which includes contacts controlled by said turret for rendering said amplifier inoperative except when the turret is in an indexing position.

9. A television camera comprising a housing determining an operative lens position, a plurality of lenses, mounted on a turret which is movable for selectively moving one or other of said lenses into said operative position, a pick-up tube mounted in said housing for focussing movement relative to the lens in the operative position, focussing means for moving said pick-up tube, an electric drive including a reversible A. C. motor for said focussing means, said motor having two windings, control means for said drive comprising an electric alternating-current bridge circuit having branches each including a potentiometer constituted by an impedance member and a movable tapping member cooperating therewith, means actuated by said motor drive for moving the tapping member of one of said potentiometers according to the movement of said focussing drive, an amplifier controlled by the voltage difference between said tapping members, one of said windings of the motor being connected to the amplifier so as to be fed by the amplifier output, means for supplying to said bridge circuit and to the other said winding alternating voltages bearing a fixed phase relation to each other, a plurality of fixed value impedance members, one for each lens on the turret, and turret-operated contact means for automatically and respectively series-connecting each said fixed-value impedance member in one of the branches of the bridge circuit when the turret is operated to place the lens associated with said member into the operative position.

10. A television camera comprising a camera housing determining an operative lens position, a lens mounted on the housing, said housing and lens being provided with means for removably holding the lens on the housing in said operative position, a pick-up tube mounted in the housing, focussing means including a reversible electric motor drive for moving said pick-up tube relative to said lens, control means for said motor drive including a bridge circuit having a tapped-resistor potentiometer in each branch, and voltage-responsive means interposed between the respective tappings of said potentiometer for causing the motor drive to be operated according to the voltage difference between said tappings, means operated by the motor drive for varying the position of the potentiometer tapping in one of said branches according to the focussing position of the pick-up tube, the position of the potentiometer tapping in the other branch being manually adjustable, a fixed-value resistor member and two contacts respectively connected to the two ends thereof in said lens, and two complementary contacts so arranged in the housing as to cooperate with said contacts on the lens for including said resistor of the lens in series with the potentiometer resistor in the first said branch so as to adjust the balance position of said bridge circuit according to the value of the resistor of the lens held in the operative position.

11. A television camera as claimed in claim 7, including withdrawal means actuated by movement of the turret for withdrawing said further contacts away from and out of the path of movement of the contacts carried by the mounting means as soon as the turret moves from an indexing position and until the turret again reaches an indexing position when the withdrawal means again allows the further contacts to move into engagement with the contacts on the mounting means of the lens unit in the operative position.

12. A television camera comprising a camera housing, a pick-up tube mounted in said housing, a rotatable turret comprising an annular plate rotatably mounted at the front of said housing, a plurality of lens units each including a lens mounted on said turret, means for indexing the turret in a plurality of positions in which the different lenses are selectively positioned in an operative position in front of the pick-up tube, an electric motor, focussing mechanism driven by said motor for moving said pick-up tube towards and away from the lens in the operative position for focussing the camera, a focus control member, an electric circuit controlled by said focus control member and including said electric motor and follow-up means for causing said motor to move in accordance with the movement of the focus control member, each lens unit also including an electrical impedance element individual to the lens unit and connected to contacts on a side face of the lens unit which faces the axis of the turret, a boss extending through the central aperture in the turret plate, a slide on said boss guided for sliding movement in a radial direction towards the lens unit in the operation position, a spring for urging said slide towards said lens unit in the operative position, further contacts carried by the outer end of said slide and arranged to make contact with the contacts of the lens unit in the operative position when the slide is moved outwardly by the spring, said further contacts being connected to said electric circuit whereby the impedance element of the lens unit in the operative position is connected in the electric circuit to adjust the operation of the follow-up means and thus adjust the position to which the focussing mechanism is adjusted for any predetermined setting of the focus control member, and means movable with the turret plate and engaging with the slide to move the slide inwardly against the spring, and thus move said further contacts carried by the slide out of the path of movement of the contacts on the side faces of the lens units, except when the turret is in an indexing position.

References Cited in the file of this patent

UNITED STATES PATENTS

| | | |
|---|---|---|
| 1,271,929 | Nelson | July 9, 1918 |
| 1,795,325 | Wittel | Mar. 10, 1931 |
| 2,000,090 | Mitchell | May 7, 1935 |
| 2,067,189 | Howell | Jan. 12, 1937 |
| 2,186,542 | Gloess | Jan. 9, 1940 |
| 2,187,246 | Nerwin | Jan. 16, 1940 |
| 2,222,292 | Gorlich | Nov. 19, 1940 |
| 2,312,954 | Bown | Mar. 2, 1943 |
| 2,315,406 | Eddy | Mar. 30, 1943 |
| 2,345,365 | Steiner | Mar. 28, 1944 |
| 2,355,136 | Bedford | Aug. 8, 1944 |
| 2,403,023 | Reynolds | July 2, 1946 |
| 2,572,729 | Jackson et al. | Oct. 23, 1951 |
| 2,618,209 | Silent | Nov. 18, 1952 |